United States Patent Office 3,352,860
Patented Nov. 14, 1967

3,352,860
PROCESS FOR THE MANUFACTURE OF ORGANIC NITROGEN-HALOGEN COMPOUNDS
Karl Hass and Hans G. Epler, Ranzel, and Ferdinand Langenhoff, Troisdorf, Germany, assignors to Dynamit Nobel Aktiengesellschaft, Troisdorf, Bez. Cologne, Germany, a corporation of Germany
No Drawing. Filed Aug. 13, 1964, Ser. No. 389,466
Claims priority, application Germany, Aug. 17, 1963, D 42,276
16 Claims. (Cl. 260—248)

This invention relates to a process for the manufacture of organic nitrogen-halogen compounds and more particularly relates to a process for manufacturing organic nitrogen-halogen compounds by reacting an organic nitrogenous compound having at least one hydrogen atom bound to the nitrogen with an anhydride of a hypohalogenic acid.

The prior art processes for the manufacture of organic nitrogen-halogen compounds, and particularly nitrogen-chlorine compounds, are carried out using water as the reaction medium. For example, trichloro or dichloroisocyanuric acid is obtained by the introduction of chlorine into an aqueous suspension of cyanuric acid. The aforesaid processes require a very accurate maintenance of a certain pH range, which is usually achieved by the use of rather large quantities of buffer solutions or by the addition of an alkaline substance. The use of phosphate or acetate buffers is conventional in this connection. Sodium or potassium hydroxide has been generally used as the alkaline substance.

According to another proposal, trichloroisocyanuric acid can be made by introducing chlorine into a sodium bicarbonate suspension refrigerated to 0° C. at a pH of up to 3.3. This suspension, while still maintained at a temperature of 0° C., is then adjusted with sodium cyanurate solution to obtain a pH of 4.6. The end product develops as a precipitate which is easily isolated by filtration.

In another known process, the individual stages of the chlorination of trichloroisocyanuric acid are carried out successively. Each individual step of the reaction requires both an accurate adjustment to a certain pH range by means of appropriate buffers, and additionally the maintenance of a certain narrow temperature range.

The presently known processes require, as has already been stated, on the one hand a constant control of the pH value, and on the other hand the maintenance of relatively low temperatures by means of brine refrigeration. The products recovered by filtration have to be washed and dried carefully, as otherwise they do not have sufficient stability and cannot as a result be stored for long periods. Due to the need for careful washing, large quantities of mother liquor are produced when these products are manufactured on an industrial scale, and this usually has to be reprocessed for reasons of economy.

Still another disadvantage of the known processes is the development of by-products. For example, in the isocyanuric acid reaction according to the above-described processes, varying amounts of nitrogen trichloride are produced.

It is the principal object of the present invention to provide a process for manufacturing organic-nitrogen-halogen compounds without the disadvantages accompanying the known procedures.

Another object of the invention is to provide a process for manufacturing organic nitrogen-halogen compounds which is economically and easily carried out and which produces substantially the desired organic nitrogen-halogen reaction products and substantially no undesirable by-products.

Other objects and advantages of the process of the present invention will be apparent from the following detailed description.

In accordance with the invention, it has now surprisingly been found that the above disadvantages can easily be avoided by reacting an organic nitrogenous compound having at least one hydrogen atom bound to the nitrogen with an anhydride of a hypohalogenic acid in an organic solvent medium.

The process of the present invention can also be carried out when the starting product is only suspendable in the solvent used for the hypohalogenic acid anhydride. Surprisingly, the halogenation is also in this case practically quantitatively effected, although an intensive and thorough mixing is necessary.

Substitution of a plurality of nitrogen-bound halogen atoms can be carried out successively by the process of the invention since it has been observed that, during the reaction, due to different speeds of reaction and the various stages of substitution, a certain amide, imide, or lactam hydrogen is practically the first to be substituted quantitavely, before a multiple substitution begins.

One special advantage of the present process lies in the fact that a large part of the compounds herein involved, either as starting materials, or as end products, are substantially insoluble in the solvents generally used, such as for instance, carbon tetrachloride or chloroform, so that, especially in the latter case, the advantage is obtained that processing of the mother liquor is eliminated. Any unreacted and dissolved starting material can be fed directly back to the reaction. Where a difficultly soluble starting material is used which does not go into solution until after the reaction, the procedure can be reversed. Needless to say, the speed of reaction is greater when the starting product is soluble.

The products which are obtained by the present process are characterized by an especially good fusibility.

The new process for nitrogen-halogenation is furthermore characterized by the advantage that the anhydride of of the hypohalogenic acid needs to be used in only a very slight excess. Even an excess of the order of 2 to 5% above that amount stoichiometrically necessary has proven sufficient for a quantitative reaction.

The process for the manufacture of nitrogen-halogen compounds is especially suitable for the conversion of organic nitrogenous compounds of the amide, imide, and lactam type to the corresponding mono or poly-substituted nitrogen-halogen compounds. Both the imides and amides of aliphatic, cycloaliphatic, aromatic, fatty aromatic and heterocyclic carboxylic acids and of the corresponding sulfonic acids, such as benzenesulfonic acids, can be reacted according to the invention. But also simple nitrogen-substituted amides, such as acetanilide or its derivatives can be used for the reaction of the present invention. The amides and imides derived from carbon dioxide, such as urea, biuret, guanidine, isocyanuric acid, barbituric acid, hydantoin, parabanic acid, and uric acid, as well as the derivatives thereof can be suitably used in the process of the invention.

The anhydride of a hypohalogenic acid dissolved in an organic solvent for the halogenation of the compounds containing organic nitrogen, and having at least one hydrogen atom bound to the nitrogen is advantageously obtained by the treatment of suspended mercuric oxide with the corresponding halogen, with the resultant anhydride simultaneously going into solution. In this manner it is possible to manufacture the dichloroxide and dibromoxide. After filtering off the mercury halides that form ($HgCl_2$ or $HgBr_2$), the solution remaining can be used immediately after titration for the reaction.

As solvents for the process of the present invention, any of the known solvents can be used, which are not oxidizable under the conditions of the reaction, and which furthermore possess a high dissolving ability for the anhydrides of hypohalogenic acid. In addition to alcohols, ketones and ethers, the halogenated hydrocarbons have proven especially useful on account of the slight danger of ignition attendant their use. An adequate ability to dissolve the anhydrides of hypohalogenic acids is possessed by carbon tetrachloride and chloroform and by the various chlorination products of ethane and ethylene. Mixtures of different highly chlorinated methanes, ethanes, and ethylenes can also be used with advantage.

The order in which the individual reactants are added is unimportant in the case of organic nitrogenous compounds which have only one substitutable hydrogen atom. If, however, there exists the possibility of a polysubstitution, it is necessary, if it is desired to stop at a particular stage of halogenation, to add the solution containing the anhydride of the hypohalogenic acid to the solution of the compound to be halogenated.

The reaction according to the instant invention may be conducted at temperatures in the range from minus 10°– plus 30° C., and preferably from plus 5° to plus 10° C.

The products manufactured by the described process are valuable organic intermediates, pharmaceutical chemicals, disinfectant and bleaches.

The following examples are given to illustrate the procedure of the present invention but are not to be construed as limiting.

EXAMPLE 1

43.5 grams dichloroxide were dissolved at about 5 to 8° C. in 1500 g. chloroform (approximately 3% solution). 50 grams dry hydantoin were added, little by little with intense stirring to the resulting solution. The temperature was allowed at the same time to rise to 20–25° C. and mixture was then stirred for another hour. The reaction product was separated by suction filtering and washed with chloroform until free of chlorine. Thereafter, it was dried in the usual manner. The yield of N,N'-dichloro-hydantoin amounted theoretically to 89 grams; 81 grams were actually recovered. The chlorine content theoretically was 42.2%; a value of 38.2% was actually found.

EXAMPLE 2

To 443 grams carbon tetrachloride containing 11.5 grams $Cl_2O$ (2.5% solution), 20 grams of previously dried benzenesulfonamide were added with stirring, at a temperature of 4 to 6° C. Thereupon the benzenesulfonamide reacted with chlorine monoxide and went into solution. The solvent was removed by evaporation and the residual crystalline mass was suction filtered and washed with ice-cold $CCl_4$. (The wash filtrate could be concentrated for further recovery of crystalline material.) The yield of N,N-dichlorobenzenesulfonamide amounted to 26.5 g. (theoretical yield: 29 g.). Chlorine content: 30.82% (theoretical: 31.4%).

EXAMPLE 3

30 g. anhydrous cyanuric acid were gradually added to a solution of 30.5 g. dichloroxide in 600 g. $CCl_4$ (5% solution), with intensive stirring.

The initial temperature was 6 to 8° C. The temperature was then raised within 15 minutes to 20 to 25° C. with cooling, and the reaction was permitted to continue for another 45 minutes at this temperature.

The reaction mixture was then suction filtered and the filtrate was washed with carbon tetrachloride until free of chloride monoxide.

After drying in an air stream, 52.5 g. N,N',N''-trichloroisocyanuric acid were obtained (theoretical yield 54 grams.)

The chlorine content amounted to 43.5%.

EXAMPLE 4

1,000 grams $CHCl_3$ having a 5% dichloroxide content (50 g. $Cl_2O$ absolute) were placed in a vessel provided with an agitator. The temperature was approximately 5° C. Into this solution, 67 grams cyanuric acid were gradually suspended, the temperature being kept within a range of 10 to 20° C.

After about 60 minutes, the finely divided reaction product was washed with the solvent and dried with hot air. The yield of N,N'-dichloroisocyanuric acid amounted to 118 g. (theory: 123 g.). The chlorine content of the N,N'-dichloroisocyanuric acid amounted to 35% (theoretical: 35.8%).

EXAMPLE 5

6 g. urea were suspended in 350 g. carbon tetrachloride and 9 g. dichloroxide in 180 g. carbon tetrachloride were gradually added with strong stirring at a temperature of 5–10° C. The initial brown color of the solution paled and after an hour of stirring, the product was separated by suction filtering. It was washed and dried in a vacuum drier.

The yield was 11 g. N,N'-dichlorourea having a chlorine content of 48.5% (theoretical 55%).

EXAMPLE 6

19.8 grams succinimide were poured with refrigeration and stirring in a 2.5% solution of dichloroxide in carbon tetrachloride (total 344.7 g. $Cl_2O$). The mixture was stirred for 1 to 2 hours at about 12° C. After suction filtering, the residue was suspended in carbon tetrachloride and again suction filtered. The product was dried in a nitrogen current.

Yield: 24.6 g. N-chlorosuccinimde (theory 26.7 g.). Chlorine content: 23.6% (theory 26.5%).

EXAMPLE 7

348 g. of a 2.5% solution of dichloroxide in carbon tetrachloride were refrigerated to about 0° C. and brought to reaction under intensive stirring with 23.4 g. indole. The addition had to be done slowly so that the temperature did not increase too greatly. The reaction product, after suction filtering, was dried in a nitrogen current.

Yield: 27 g. N-chloro-indole (theory 30 g.). Chlorine content: 23.6% (theory 23.4%).

EXAMPLE 8

7.5 grams isatine were added to 200 g. carbon tetrachloride and precooled to −10° C. Thereafter 174 g. of a 1.3% solution dichloroxide in carbon tetrachloride was added drop-wise whereupon the solution warmed to −5° C.

The solution was stirred for another hour. The reaction product was suction filtered and washed with 150 g. cold carbon tetrachloride.

Analysis of the filtrate showed the presence of 0.2% $Cl_2O$. Yield: 6.6 g. N-chloro-isatine. Chlorine content: Theoretical 19.5%, pract. 3.7%.

The use of a solvent mixture of carbon tetrachloride and methyl ethyl ketone (1:1) gave in all cases identical results.

What is claimed is:

1. Process for the production of organic N-halogen compounds which comprises reacting an organic nitrogenous compound having at least one hydrogen atom bound to the nitrogen with an anhydride of a hypohalogenic acid in an organic solvent medium at a temperature and for a time sufficient for the reaction to go substantially to completion.

2. Process according to claim 1 wherein said nitrogenous compound is utilized in the form of its suspension in an organic solvent.

3. Process according to claim 1 wherein said solvent is a member selected from the group consisting of organic alcohols, ketones, ethers, and halogenated hydrocarbons.

4. Process according to claim 1 wherein said anhydride is employed in an amount of approximately 2–5% above the stoichiometrically required amount for the reaction.

5. Process according to claim 1 wherein said nitrogenous compound contains at least 2 hydrogen atoms bound to the nitrogen.

6. Process according to claim 5 wherein said reaction is effected until substitution of only one of said hydrogen atoms is achieved.

7. Process according to claim 5 wherein said reaction is effected stage-wise until substitution of at least two of said hydrogen atoms has been achieved.

8. Process according to claim 7 wherein said reaction is effected by adding the solution of said anhydride to the organic nitrogenous compound.

9. Process for the production of N,N'-dichloro-hydantoin which comprises reacting dichloroxide dissolved in chloroform with hydantoin at a temperature of about 20–25° C. for a time sufficient for the reaction to go substantially to completion.

10. Process for the production of N,N-dichlorobenzenesulfonamide which comprises reacting $Cl_2O$ dissolved in carbon tetrachloride with benzenesulfonamide at a temperature of about 4 to 6° C. and for a time sufficient for the reaction to go substantially to completion.

11. Process for the production of N,N',N''-trichloroisocyanuric acid which comprises reacting dichloroxide dissolved in chloroform with anhydrous cyanuric acid at a temperature of about 20–25° C. and for a time sufficient for the reaction to go substantially to completion.

12. Process for the production of N,N'-dichloroisocyanuric acid which comprises reacting dichloroxide dissolved in chloroform with cyanuric acid at a temperature within the range of 10–20° C. and for a time sufficient for the reaction to go substantially to completion.

13. Process for the production of N,N'-dichlorourea which comprises reacting dichloroxide dissolved in carbon tetrachloride with urea at a temperature of 5–10° C. and for a time sufficient for the reaction to go substantially to completion.

14. Process for the production of N-chlorosuccinimide which comprises reacting dichloroxide in solution in carbon tetrachloride with succinimide at a temperature of about 12° C. for a time sufficient for the reaction to go substantially to completion.

15. Process for the production of N-chloro-indole which comprises reacting dichloroxide in solution in carbon tetrachloride with indole at a temperature of about 0° C. for a time sufficient for the reaction to go substantially to completion.

16. Process for the production of N-chloro-isatine which comprises reacting dichloroxide in solution in carbon tetrachloride with isatine at a temperature of about −5 to −10° C. and for a time sufficient for the reaction to go substantially to completion.

References Cited
UNITED STATES PATENTS 2,828,308   3/1958   Lorenz _____ 260—248

OTHER REFERENCES

Phillips et al., Proc. Chem. Soc. (1962) pp. 294–5 available through Chemical Abstracts, vol. 58, col. 2331h (1963).

Schwarz et al., Z. anorg allgen. Chem. vol. 224, pp. 29–32 (1935) available through Chemical Abstracts, vol. 29, col. 78496 (1935).

WALTER A. MODANCE, *Primary Examiner.*

JOHN M. FORD, *Assistant Examiner.*